United States Patent Office 3,476,358
Patented Nov. 4, 1969

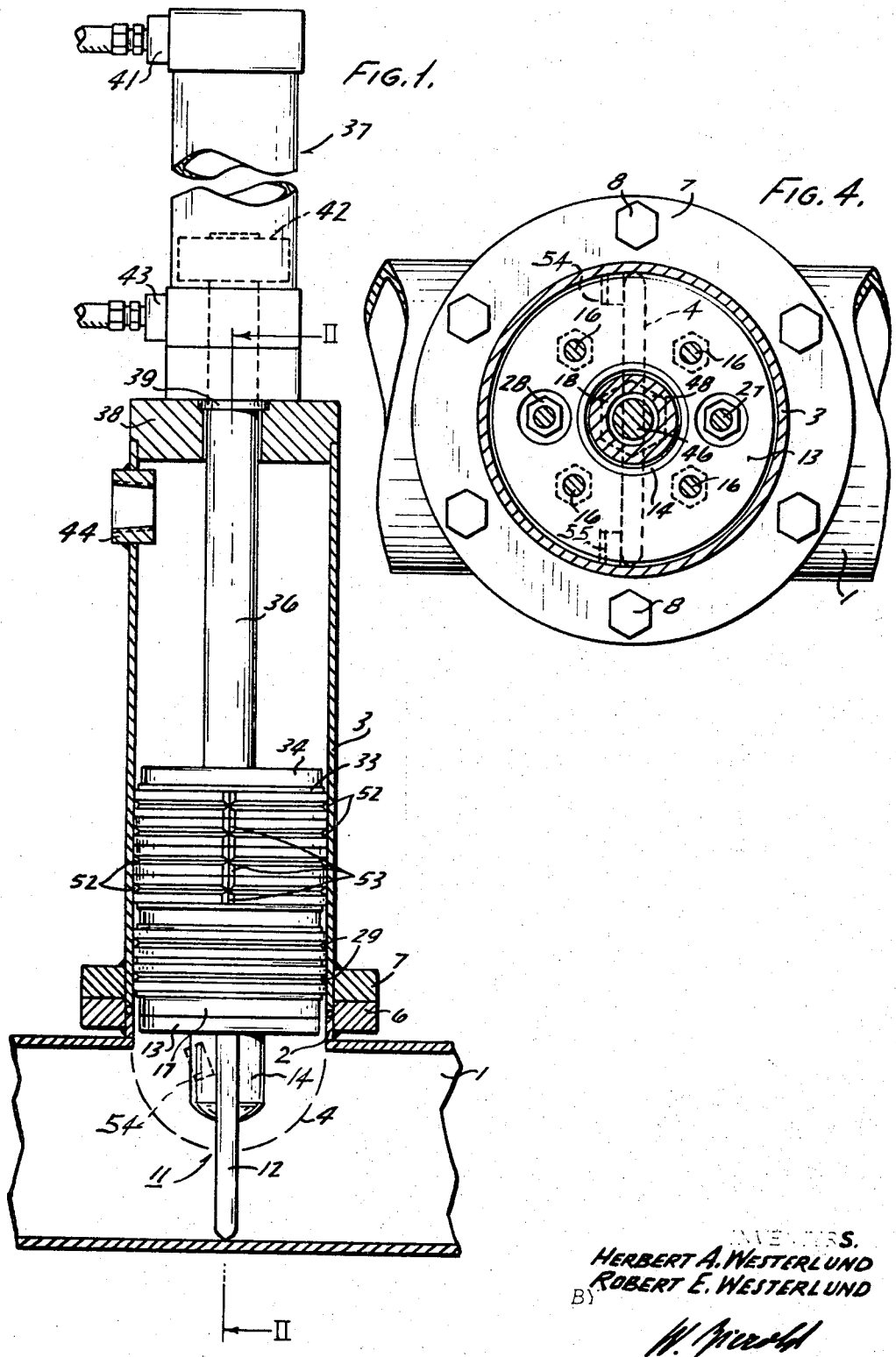

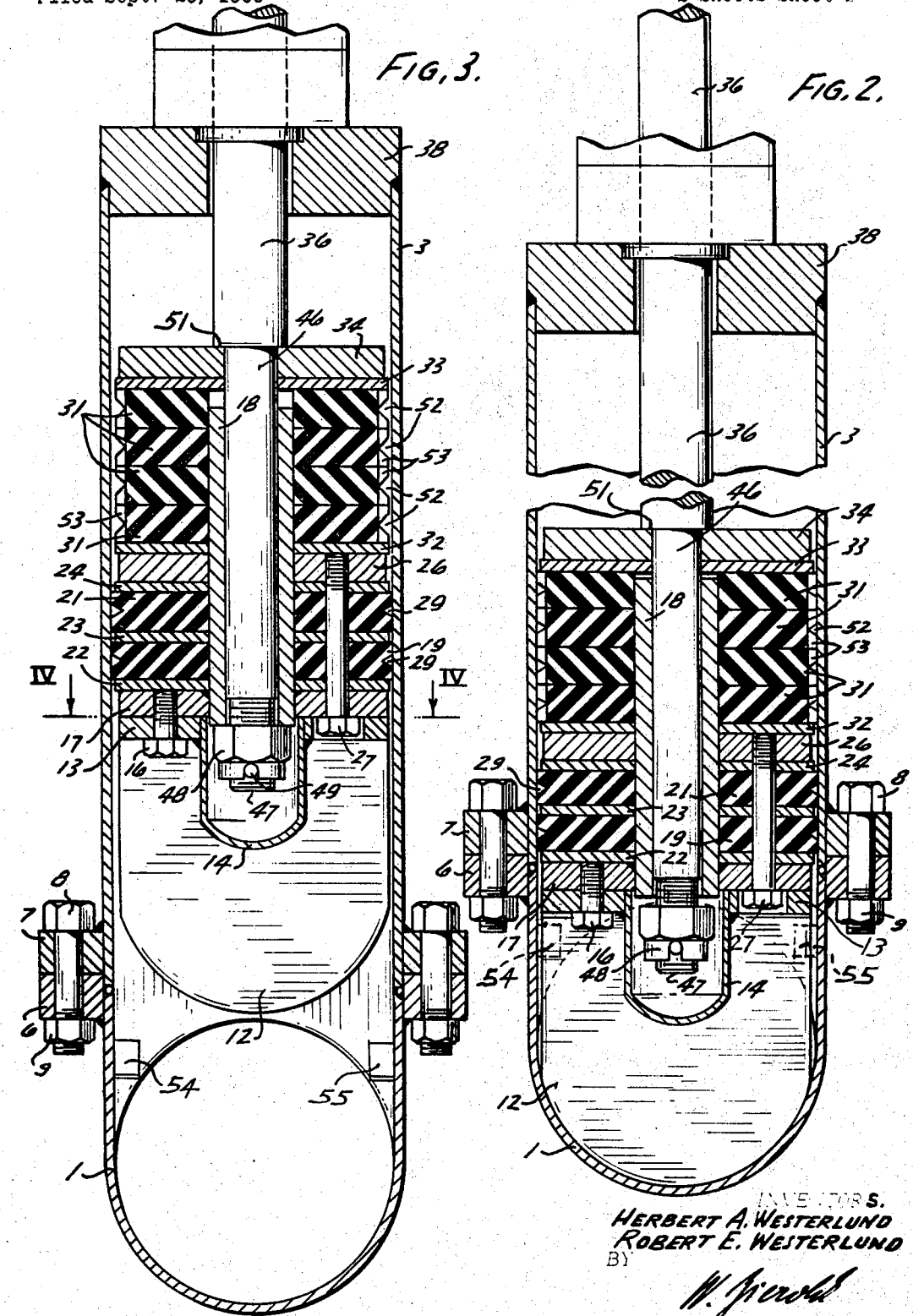

3,476,358
GATE VALVE
Herbert A. Westerlund, Port Washington, and Robert E. Westerlund, Mequon, Wis., assignors to Koehring Company, Milwaukee, Wis., a corporation of Wisconsin
Filed Sept. 29, 1966, Ser. No. 582,940
Int. Cl. F16k 31/44, 17/18, 3/03
U.S. Cl. 251—214                                  7 Claims

ABSTRACT OF THE DISCLOSURE

A mechanism for operating a gate valve comprises a double acting hydraulic ram, and opening and closing thrust transmitting connections between the ram piston and the gate. The opening thrust transmitting connection is expandable in valve closing direction, and the closing thrust transmitting connection includes an axially compressible and radially expandable packing between the valve stem and a surrounding housing portion. During the gate closing stroke of the ram the packing remains axially expanded and radially contracted until the gate bottoms in its closed position. Subsequent build-up of closing pressure by the ram and consequent radial expansion of the packing securely locks the gate in its closed position. Release of the closing thrust upon the seated gate causes radial contraction of the packing and consequent unlocking of the gate.

---

The invention relates to valves, and it is concerned more particularly with a gate valve which may be used to control the flow of plastic concrete containing aggregate, or a similar mixture of fluid and solid materials.

Generally, it is an object of the invention to provide an improved gate valve having a substantially straight tubular passage which may be closed and opened by a back and forth movable gate, and wherein such passage is substantially devoid of internal obstructions which may impede the free flow of concrete therethrough while the gate is in its open position.

More specifically, it is an object of the invention to provide an improved mounting of the back and forth movable gate, which will securely hold the gate against deflection or displacement from its closed position under the pressure of concrete acting transversely upon the closed gate, and which will nevertheless permit back and forth movement of the gate without undue frictional resistance.

A further object of the invention is to provide an improved gate valve of the mentioned character wherein the gate has a stem which is surrounded by a yieldable packing, and wherein such packing is automatically tightened after the gate has been moved to its closed position, and wherein the packing is automatically loosened before the gate is moved from its closed toward its open position.

A further object of the invention is to provide a gate valve incorporating yieldable packing means of the above mentioned character and supplementary sealing means which will prevent fluid leakage past the packing means.

A still further object of the invention is to provide an improved gate valve of the above mentioned character which will stand up under severe operating conditions, as in a concrete pump; which will operate efficiently without undue wear for prolonged periods of time; which is simple and compact in construction, and which may be manufactured at relatively low costs.

These and other objects and advantages are attained by the present invention various novel features of which will be apparent from the description herein of a preferred embodiment of the invention and will be pointed out by the appended claims.

Referring to the drawings:

FIG. 1 is an elevational view, partly in section, of a valve embodying the invention;

FIG. 2 is a partial view, on an enlarged scale, taken in section on line II—II of FIG. 1;

FIG. 3 is a view similar to FIG. 2 but showing the valve in open position; and

FIG. 4 is a section on line IV—IV of FIG. 3.

The valve shown in the drawings has a housing which is fabricated of steel tubing and which comprises a tubular section 1, a tubular stub section 2 at right angles to the section 1, and a tubular section 3 in alignment with the stub section 2. The tubular sections 1 and 2 have the same diameter and are welded together along their intersection line indicated at 4 in FIG. 1. The stub section 2 and tubular section 3 are detachably connected together by flanges 6, 7, cap screws 8 and nuts 9.

The tubular housing section 1 provides a cylindrical flow passage which may be closed and opened by an endwise back and forth movable gate 11. The gate comprises a plate-like blade section 12 which extends transversely of the flow passage 1 and is integrally connected in depending position to a circular head plate 13. A thimble 14 is secured, as by welding, in a central cut out of the blade 12 below the head plate 13, and in a central aperture of the plate 13 surrounding the upper end of the thimble.

Detachably secured to the upper side of the head plate 13 of the gate by means of cap screws 16 is a circular pressure plate 17 which has a central aperture in alignment with the central aperture of the head plate 13.

Rigidly secured in the central aperture of the pressure plate 17, as by welding, is a tubular valve stem 18 which has a free upper end at a substantial axial distance from the pressure plate 17.

A stack of sealing washers 19 and 21 of rubberlike material, such as polyurethane, surrounds the valve stem 18 within the tubular housing section 3. Metal washers 22, 23, 24 serve as backing washers for the resilient sealing washers 19 and 21, and are radially spaced from the interior cylindrical surface of the housing section 3. The backing washers are made of non-ferrous metal, preferably aluminum, in order to avoid possible scoring of the smoothly finished inner wall of the housing section 3.

The pressure plate 17 is connected with the tubular stem 18 in face to face relation with one end of the stack of washers 19 to 24, and another pressure plate 26 faces the other end of the stack in axially movable relation to the stem 18. A pair of cap screws 27 and 28 extend through the pressure plate 17 and washers 19 to 24, and are screw threaded into tapped holes of the pressure plate 26. The heads of the cap screws 27 and 28 project into holes of the head plate 13 which are large enough to permit turning of the cap screws by means of a socket wrench. Axial compression of the sealing washers 19 and 21 by tightening of the cap screws 27 and 28 causes radial expansion of the sealing washers into sealing engagement with the inner cylindrical surface of the tubular housing section 3. The cap screws 27 and 28 are drawn up only far enough to establish a moderate radial pressure of the sealing washers against the tubular housing section 2 so that endwise back and forth movement of the gate will not be unduly impeded by friction between the sealing washers and the housing section 3. Axial compression of the sealing washers 19 and 21 also causes the inner periphery of each washer to bear firmly against the cylindrical outer surface of the tubular stem 18. An annular groove 29 in each sealing washer provides space in which lubricant may accumulate to reduce friction between the sealing washers and the surrounding tubular housing section 3 during back and forth movement of the gate between its closed and open positions in which it is shown in FIGS. 2 and 3, respectively.

A stack of four resilient packing washers 31 of rubber like material, such as polyurethane, surrounds the tubular valve stem 18 above the pressure plate 26. A backing washer 32 is interposed between the pressure plate 26 and the adjacent packing washer 31, and another backing washer 33 bears upon the top of the stack of packing washers 31 in axially movable relation to the stem 18.

The pressure plate 26 on top of the stack of sealing washers represents a first pressure plate which is connected with the gate 11 and stem 18 through the intermediary of the stack of sealing washers 19, 21, associated backing washers 22–24, cap screws 27, 28, pressure plate 17 and cap screws 16, in face to face relation with the lower end of the stack of packing washers 31.

Another pressure plate 34 faces the upper end of the stack of packing washers 31 is axially movable relation to the valve stem 18.

A reversible power transmitting mechanism for moving the gate 11 endwise back and forth between its closed and open positions comprises an actuating rod 36 in axial alignment with the tubular housing section 3. In the illustrated embodiment of the invention the rod 36 forms an extended piston rod of a double acting hydraulic ram 37 which is connected with the upper end of the housing section 3. An end plate 38 of the hydraulic ram 37 is rigidly secured within the tubular housing section 3, and has a packing gland 39 for the reciprocable rod 36. Admission of pressure fluid through a port 41 at the upper end of the ram above the ram piston 42 produces an axial force upon the actuating rod 36 in valve closing direction, and admission of pressure fluid through a port 43 at the lower end of the ram below the piston 42 produces an axial force upon the actuating rod in valve opening direction. A fluid port 44 at the upper end of the housing section 3 provides for the admission of washing fluid, preferably water, into and its emission from the space within the housing section 3 above the packing washers 31 during the down and up strokes, respectively, of the gate 11.

The actuating rod 36 has a lower portion 46 (FIG. 3) of reduced diameter which extends through the tubular valve stem 18 and has an outside diameter slightly smaller than the inside diameter of the valve stem. The lower end portion 47 of the rod 36 forms a threaded stud which extends into the thimble 14. A castellated nut 48 on the threaded stud portion 47 is locked in adjusted position by a cotter pin 49.

Referring to FIG. 3, which shows the valve in its open condition, it will be noted that the upper pressure plate 34 on top of the stack of sealing washer 31 has a central aperture of a diameter which is smaller than the diameter of the rod portion 36 which extends upwardly from the reduced diameter rod portion 46. In other words, the actuating rod 36 has a shoulder 51 in downward thrust transmitting relation to the pressure plate 34. The upper end of the tubular valve stem 18 projects partly into the uppermost packing washer 31 and terminates short of the backing washer 33. The nut 48 is adjusted on the stud 47 to a position in which it contacts the lower end of the stem 18 which projects into the thimble 14.

In the condition of the valve as shown in FIG. 3, the packing washers 31 are held axially together between the pressure plates 26 and 34 without appreciable axial compression. The inside diameters of the packing washers in their natural unstressed condition are substantially equal to the outside diameter of the valve stem 18, and in the same condition their outside diameters are appreciably smaller than the inside diameter of the housing section 3. Accordingly, in the stacked condition of the packing washers as shown in FIG. 3, their inside peripheries contact the outside cylindrical surface of the valve stem 18, but their outside peripheries are spaced from the inside cylindrical surface of the housing section 3 by annular gaps.

Each packing washer has a V-shaped annular groove 52 in its outer periphery and an axial semicircular groove 53 extending across the V-shaped groove from one face of the washer to the other. In the stacked condition of the washers 31 as shown in FIG. 1 the semi-circular grooves 53 are in alignment with each other and form a continuous axial fluid passage across the full height of the stack at its outer periphery.

Fluid pressure admitted through the port 43 to the lower side of the piston 42 maintains the valve in the open position in which it is shown in FIG. 3. When the fluid pressure is diverted from the port 43 to the port 41 it acts upon the upper surface of the piston 42. Downward thrust is thus transmitted from the actuating rod 36 through the shoulder 51 upon the upper pressure plate 34 and from the latter through the backing washer 33, stack of packing washers 31, backing washer 32, pressure plate 26, backing washer 24, sealing washer 21, backing washer 23, sealing washer 19 and backing washer 22 to the gate assembly comprising the pressure plate 17, stem 18, and gate 11. The arcuate lower edge of the gate blade 12 and its vertical side edges are attenuated to provide a blunt cutting edge which will readily penetrate into a mass of plastic concrete within the tubular housing section 1. A relatively light axial thrust will therefore normally suffice to move the gate 11 from its open to its closed position, and the packing washers will not appreciably expand radially under such axial thrust. Accordingly, downward movement of the gate from its open to its closed position will not be impeded by friction of the packing washers 31 along the inner cylindrical surface of the housing section 3.

When the gate has been moved to the closed position of FIG. 2, the fluid pressure acting upon the upper side of the ram piston 42 rises and causes axial compression of the stack of packing washers 31 by movement of the pressure plate 34 and backing washer 33 toward the gate 11, the axial spacing between the upper end of the valve stem 18 and the washer 33 shortens, and the nut 48 moves downwardly away from the lower end of the stem 18, as shown in FIG. 2. As a result of the axial compression of the packing washers 31 their outer peripheries are forced into firm radial engagement with the surrounding tubular housing section. As a result, the gate will be securely held in its closed position so that it will be able to take up relatively heavy axial pressures which might be exerted upon it by concrete in the housing section 1.

On the other hand, when fluid pressure upon the upper surface of the ram piston 42 is released prior to movement of the gate from its closed to its open position, the stack of packing washers 31 will expand axially, and simultaneously contract radially. Opening movement of the gate from its closed position will therefore not be opposed objectionably by frictional engagement of the packing washers with the surrounding housing section 3.

Washing fluid which circulates through the housing section 3 during opening and closing movement of the gate will fill the annular grooves 52 of the packing washers 31. The semi-circular axial grooves 53 facilitate distribution of the washing fluid in the annular grooves 52 and also avoid trapping of the washing fluid in the annular grooves during axial compression of the packing washers.

In order to prevent rotation of the gate 11 within the valve housing about the axis of the actuating rod 36, guide lugs 54 and 55 are secured, as by welding, to the inside of the stub section 2, as best shown in FIGS. 1 and 4. The guide lugs are offset from one side of a plane which extends at right angles to the housing section 1 through the axis of the actuating rod 36, so that they will be spaced a short distance, such as one-eighth of an inch, from the adjacent face of the blade section 11 when the gate is in its closed position at exactly right angles to the axis of the housing section 1. To facilitate cooperative engagement of the guide lugs 54, 55 with the blade 12 of the gate, the guide lugs are positioned at a lead-in angle as shown in FIG. 1 for the lug 54.

The actuating rod 36 and associated thrust transmitting elements afford reversible thrust transmitting means which are operable in one direction to sequentially move the gate 11 into its closed position and effect axial compression of the packing washers 31, and which, by operation in the other direction, sequentially relax the axial compression of the packing washers and move the gate from its closed to its open position.

The nut 48 and adjacent end of the stem 18 afford one-way connecting means between the actuating rod 36 and the gate assembly, which are operative to transmit axial thrust of the rod 36 in valve opening direction to the gate assembly, and to accommodate axial movement of the rod 36 in valve closing direction relative to the gate assembly. The pressure plate 34 and shoulder 51 afford connecting means between the actuating rod 36 and the packing washers 31, which are operative to transmit axial thrust of the actuating rod in valve closing direction to the packing washers.

The pressure plate 26 represents a first pressure plate which is connected with the gate assembly in face to face relation to the lower end of the stack of packing washers 31, and the plate 34 represents a second pressure plate which is operatively associated with the rod 36 in facing relation to the other end of the stack of packing washers so as to transmit axial thrust of the rod 36 in valve closing direction to said stack.

It is claimed and desired to secure by Letters Patent:

1. In a valve for controlling the flow of plastic concrete or the like, the combination of a housing structure presenting a flow passage; a gate member having a rigid plate like blade section in transversely extending relation to said flow passage; and means mounting said gate member for edgewise movement of said blade section into and out of a flow blocking position within said flow passage, said mounting means comprising a stem element secured to said blade section and movable axially within a surrounding tubular portion of said housing structure, yieldable packing means surrounding said stem element and adapted to expand radially into firm engagement with said surrounding housing portion in response to axial compression thereof; and reversible thrust transmitting means operatively associated with said gate member and packing means so as to sequentially move said blade section into said flow blocking position and effect said axial compression of said packing means by operation of said thrust transmitting means in one direction, and so as to sequentially relax said axial compression of said packing means and move said blade section from said flow blocking to a flow establishing position by operation of said thrust transmitting means in the other direction.

2. A valve as set forth in claim 1 wherein said packing means comprise a stack of resilient washers of rubber like material.

3. A valve as set forth in claim 2 wherein each of said resilient washers has an annular groove at its outer periphery.

4. A valve as set forth in claim 3 wherein said annular grooves of said washers are connected in fluid communication with each other.

5. A valve as set forth in claim 1 wherein said thrust transmitting means comprise a rod element extending through said stem element and movable axially relative thereto in valve opening and valve closing directions, one-way connecting means between said rod element and said gate member operative to transmit axial thrust of said rod element in said valve opening direction to said gate member and accommodating axial movement of said rod element in said valve closing direction relative to said gate member, and connecting means between said rod element and said packing means operative to transmit axial thrust of said rod element in said valve closing direction to said packing means.

6. A valve as set forth in claim 1, wherein said packing means comprise a stack of packing washers of rubber like material, and said thrust transmitting means comprise a first pressure plate connected with said gate member in face to face relation with one end of said stack, a rod element extending through said stem element and pressure plate and movable axially relative thereto in valve closing and valve opening directions, one-way connecting means between said rod element and said gate member operative to transmit axial thrust of said rod element in said valve opening direction to said gate member and accommodating axial movement of said rod element in said valve closing direction relative to said gate member, and a second pressure plate operatively associated with said rod element in facing relation to the other end of said stack so as to transmit axial thrust of said rod element in said valve closing direction to said stack.

7. A valve as set forth in claim 1 wherein said blade section of said gate member and said packing means are spaced from each other axially of said stem element, and sealing means in the space between said blade section and said packing means are operatively interposed between said stem element and said surrounding tubular portion of said housing structure.

References Cited
UNITED STATES PATENTS

| | | | |
|---|---|---|---|
| 2,797,758 | 7/1957 | Showalter | 277—188 |
| 3,032,069 | 5/1962 | Ficklin | 138—89 |
| 3,195,907 | 7/1965 | Eckenrod | 277—188 |
| 3,205,906 | 9/1965 | Wilkinson et al. | 251—191 X |
| 3,261,613 | 7/1966 | Norick et al. | 277—188 X |
| 3,302,661 | 2/1967 | Williams | 251—291 X |

WILLIAM F. O'DEA, Primary Examiner

DAVID R. MATTHEWS, Assistant Examiner

U.S. Cl. X.R.

251—62, 326; 277—125